United States Patent [19]
Lemmens

[11] 3,802,295
[45] Apr. 9, 1974

[54] VARIABLE SPEED TRANSMISSION

[76] Inventor: Joseph Lemmens, 249-9th Ave., Iberville, Quebec, Canada

[22] Filed: Oct. 30, 1972

[21] Appl. No.: 302,119

[52] U.S. Cl. .............................................. 74/796
[51] Int. Cl. .......................................... F16h 15/50
[58] Field of Search .................................... 74/796

[56] References Cited
UNITED STATES PATENTS

| | | | |
|---|---|---|---|
| 774,782 | 11/1904 | Robinson | 74/796 |
| 888,761 | 5/1908 | Snyder et al. | 74/796 |
| 992,131 | 5/1911 | Hume | 74/796 |
| 1,797,953 | 3/1931 | Gessner | 74/796 |
| 2,029,042 | 1/1936 | Turner | 74/796 X |

*Primary Examiner*—Arthur I. McKeon

[57] ABSTRACT

A transmission arranged to produce a variable speed ratio and including a conically faced rotary and axially displaceable member carried by the rotary input member, at least one friction roller engaging the conical face, an intermediate shaft carrying each a corresponding friction roller and extending radially of the coaxial rotary input and output members, and gears coupling the intermediate shafts to the rotary output member, to transmit rotation thereto, wherein each friction roller is slidable longitudinally of the corresponding intermediate shaft. A control is associated to the conically faced member to axially displace and position the same and vary the speed ratio in response to manual or centrifugal action. A transmission of the above type arranged to produce a dynamic neutral, forward and reverse.

26 Claims, 3 Drawing Figures

PATENTED APR 9 1974

VARIABLE SPEED TRANSMISSION

This invention relates to a transmission of the type including a generally conical surface arranged to vary the speed ratio between the rotary input and output members thereof.

The transmissions of the above-mentioned type which have been proposed so far include each at least one friction roller engaging the conical surface and mounted onto an intermediate shaft. In all the above-mentioned proposed transmission, either there is no dynamic neutral or the contacting surfaces are ineffectively used and there results substantial friction and friction losses in particular when there is clutching.

It is a general object of the invention to provide a transmission of the above type which is of simple, compact and rugged construction and particularly adapted for any conventional use, such as in vehicles.

It is another object of the invention to provide a transmission of the above type which includes contacting rotary conical surfaces producing a dynamic neutral for smooth and substantially frictionless starting and having a geometry of the angles of contact arranged to reduce the friction losses and relatively optimize the efficiency of this type of transmission.

It is a further object of the invention to provide a transmission of the above type which includes conical friction rollers carried by intermediate shafts extending radially of the coaxial rotary input and output members and a simple gear train coupling the intermediate shafts to the rotary output member, whereby to produce a compact transmission.

The above and other objects and advantages of the invention will be better understood in the light of the following detailed description of preferred embodiments which are illustrated, by way of example only, in the accompanying drawings, wherein.

Figure 1:
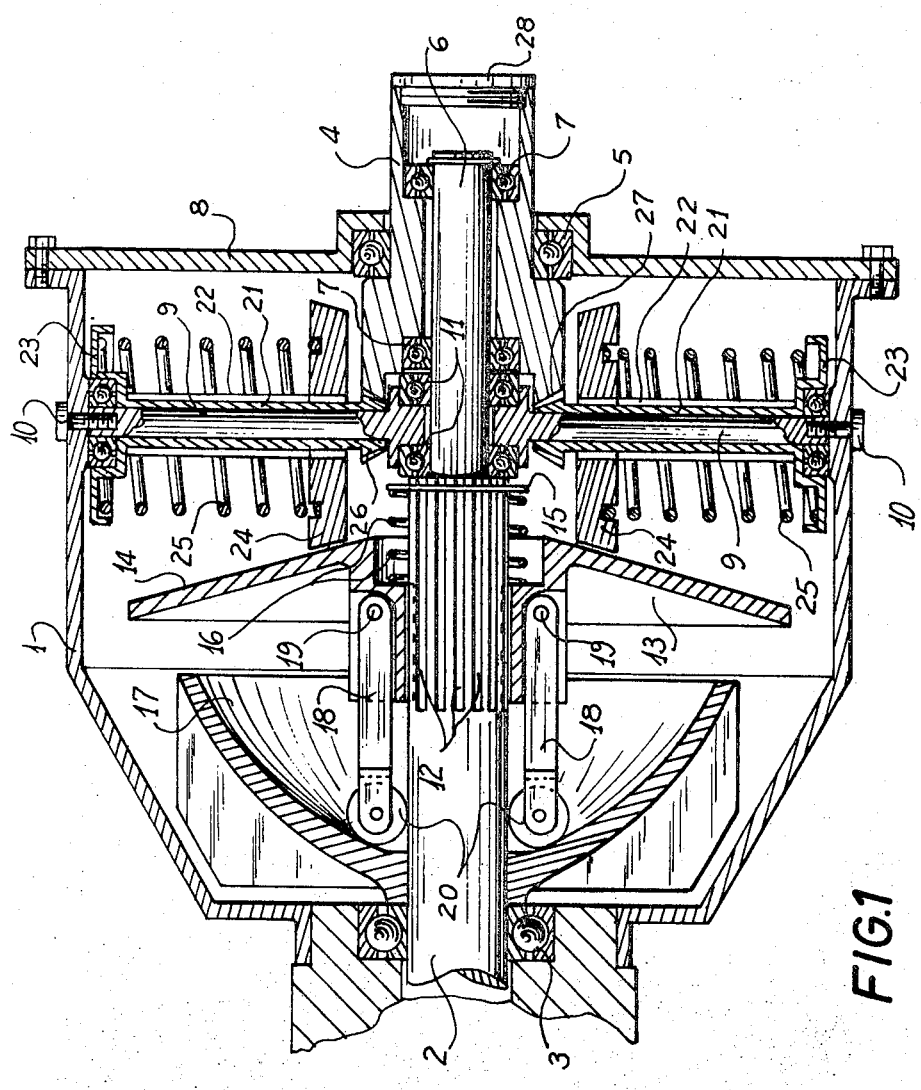
FIG. 1 is a cross-sectional view of a variable speed transmission according to a first embodiment of the invention.

The variable speed transmission illustrated in FIG. 1 includes a housing 1 having an input shaft section 2 extending through one end thereof and rotatably mounted into the latter by ball bearings 3. A tubular output shaft section 4 extends through the other end of the housing 1 and is rotatably mounted into the latter by a bearing 5 and in coaxial alignment with the input shaft section 2. The input shaft section 2 has a reduced diameter portion 6 supported coaxially into the tubular output shaft 4 by ball bearings 7. A cover 8 is removably secured to the casing 1 to give access into the latter. Pivot rods 9 extend radially of the input and output shaft sections 2 and 4 and are fixedly secured to the casing 1 by screws 10 or the like. The inner end of each pivot rod 9 is fixedly secured to the outer races of a pair of bearings 11.

The inner end of the input shaft section 2 is splined at 12 and carries a friction member or disc 13 which is internally splined to cooperate with the splined portion 12 for rotation of the disc 13 with the input shaft section and axial displacement thereof relative to the latter. The friction member or disc 13 forms a conical surface 14 facing towards the pivot rods 9. A snap ring 15 is engaged into an annular groove at the inner end of the input shaft section 2 and forms a seat for a compression spring 16 engaging against the conically faced friction disc 13.

A bowl-shaped member 17 is secured to the input shaft section 2 for rotation therewith on opposite side of the friction disc 13 relative to the conical face thereof. The concave face of the bowl-shaped member 17 is coaxial to the input shaft section 2 and faces the friction disc 13. Arms 18 are pivoted at one end onto the axially displaceable friction member 13 by transverse pins 19. Each pivoted arm 18 rotatably carries a centrifugally responsive roller 20 urged against the concave surface by the spring 16.

An intermediate tubular shaft 21 is rotatably engaged around the pivot rod 9 and is formed with exterior splines or grooves 22 and an annular flange 23 at the radially outer end thereof. A friction roller 24 is engaged around each intermediate tubular shaft 21 and cooperates with the splines 22 thereof to rotate therewith while able of longitudinal displacement relative thereto. Each annular flange 23 is arranged to form a seat for a compression spring 25 arranged to bias the corresponding friction roller 24 radially inwardly relative to the axis of the input and output shaft sections 2 and 4. A pinion 26 is secured at the inner end of each intermediate tubular shaft 21 in meshing engagement with a ring gear 27 formed or secured on the inner end of the output shaft section 4. A cap 28 is secured on the outer end of the output shaft section 4 for lubrication of the bearings thereof.

The transmission heretofore described with reference to FIG. 1 operates as follows.

As the speed of rotation of the input shaft section 2 increases, the centrifugally responsive rollers 20 spread apart away from the input shaft section and roll against the concave face of the bowl-shaped member 17 against the bias of the spring 16. As the arms 18 spread apart, the conically faced friction member is axially urged against the friction rollers 24 which react by sliding outwardly along the intermediate tubular shafts 21. The friction rollers are thence driven at a progressively higher speed, since they progressively engage a larger diameter of the disc 13. The springs 25 serve to maintain good engagement of the rollers 24 with the friction disc 13.

Figure 2:
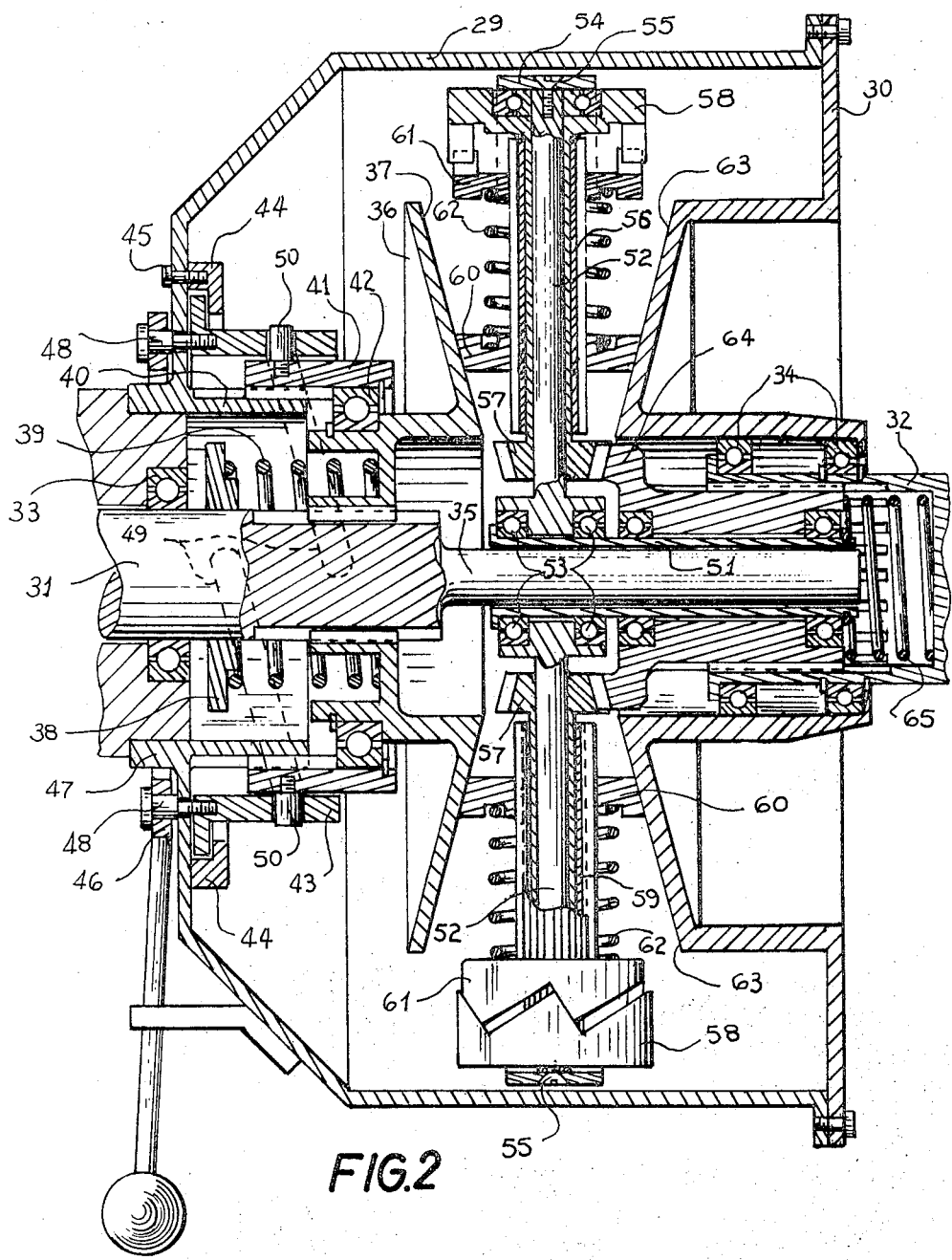
FIG. 2 is a cross-sectional view of a variable speed transmission according to a second embodiment of the invention.

The variable speed transmission illustrated in FIG. 2, according to a second embodiment of the invention, includes a casing 29 including a removable end cover 30 and which rotatably supports input and output shaft sections 31 and 32 by means of bearings 33 and 34 respectively. The input shaft section 31 includes a reduced diameter end portion 35.

A friction member, or disc 36, having a generally conical face 37 is splined onto the input shaft section 31 for rotation therewith and axial displacement relative thereto. A ring 38 is fixedly secured to the input shaft section 31 and forms an abutment for a compression spring 39, also abutting against the conically faced friction disc 36 to bias the latter inwardly.

The casing 29 forms an internal sleeve portion 40 which is externally splined for axially slidably mounting thereon a first control sleeve or ring 41. A bearing 42 is arranged to connect the axially slidable first sleeve 41 to the axially displaceable friction disc 36 for bodily axial displacement of one with the other. A second control ring or sleeve 43 is rotatably held against the internal face of the casing 29 by a radially flanged ring 44, such as by screws 45. A manual lever 46 is rotatably mounted around the external flange 47 of the casing 29 and is secured by screws 48 to the second sleeve 43 to produce rotation of the latter. The screws 48 are slidable into circular slots into the casing. The second control ring 43 is provided with a pair of helical guide slots 49 into which travel a pair of studs 50 secured into the first control ring 41 and projecting radially outwardly therefrom.

A sleeve 51 is rotatably and slidably engaged onto the reduced diameter portion 35 of the input shaft section 31. Pivot posts 52 have their inner end rotatably carried by bearings 53, extend radially and have their outer end fixedly secured to a circumscribing ring 54 by screws 55 or the like. There results that the pivot posts 52 are rotatable in unison around the input shaft section and are slidable in unison with the sleeve 51 along the reduced diameter portion 35.

A tubular intermediate shaft 56 is rotatably engaged around each pivot post 52 and has a pinion gear 57 secured to the inner end thereof and a bidirectional cam coupling element 58 secured to the outer end thereof, both for rotation therewith. A tubular shaft section 59 is rotatably secured around each tubular intermediate shaft 56 and is externally splined for the engagement of a friction roller 60 therewith. A second bidirectional cam coupling element 61 is splined onto the corresponding tubular shaft section 59 and is arranged to rotate with the latter and to slide longitudinally thereof in reaction against the corresponding outer cam coupling element 58. A compression spring 62 is engaged between each inner cam coupling element 61 and the corresponding friction roller 60 to urge the latter into frictional engagement with the axially displaceable conically faced friction disc 36 and simultaneously against the fixed conical surface 63 formed by the end cover 30 of the casing.

A driven output gear 64 meshingly engages the pinion 57 under the bias of a spring 65 and has a hub portion rotatably mounted around the axially displaceable sleeve 51. The hub portion is also externally splined to engage internal splines of the output shaft section 32 to drive the latter.

The manual control assembly may be set by the manual lever 46 to produce dynamic neutral, reverse and forward drive by centrifugal force or manually.

The manual lever 46, in the position illustrated, allows dynamic neutral and forward drive. This has been obtained by rotation of the manual lever 46 and the second control ring 43, such as to cause the studs 50 to travel into the slots 49 until the first control ring 41 and the axially displaceable friction member 36 have reached an axial position where there is a predetermined speed ratio between the friction rollers 60 and the friction disc 36. If the speed of the input shaft section 31 and the conically faced friction disc 36 is then increased, the friction rollers are centrifugally displaced outwardly and the speed ratio increases. If the manual lever 46 is displaced such that the friction rollers 60 engage the innermost portion of the conical surfaces 37 and 63, reverse drive is obtained.

When an increased load is applied onto the output shaft section 32, the cam coupling elements 58 and 61 are urged farther apart, causing a similar displacement of the friction rollers 60, a reduced speed ratio and, consequently, an increased torque is produced on the output shaft section.

Figure 3:
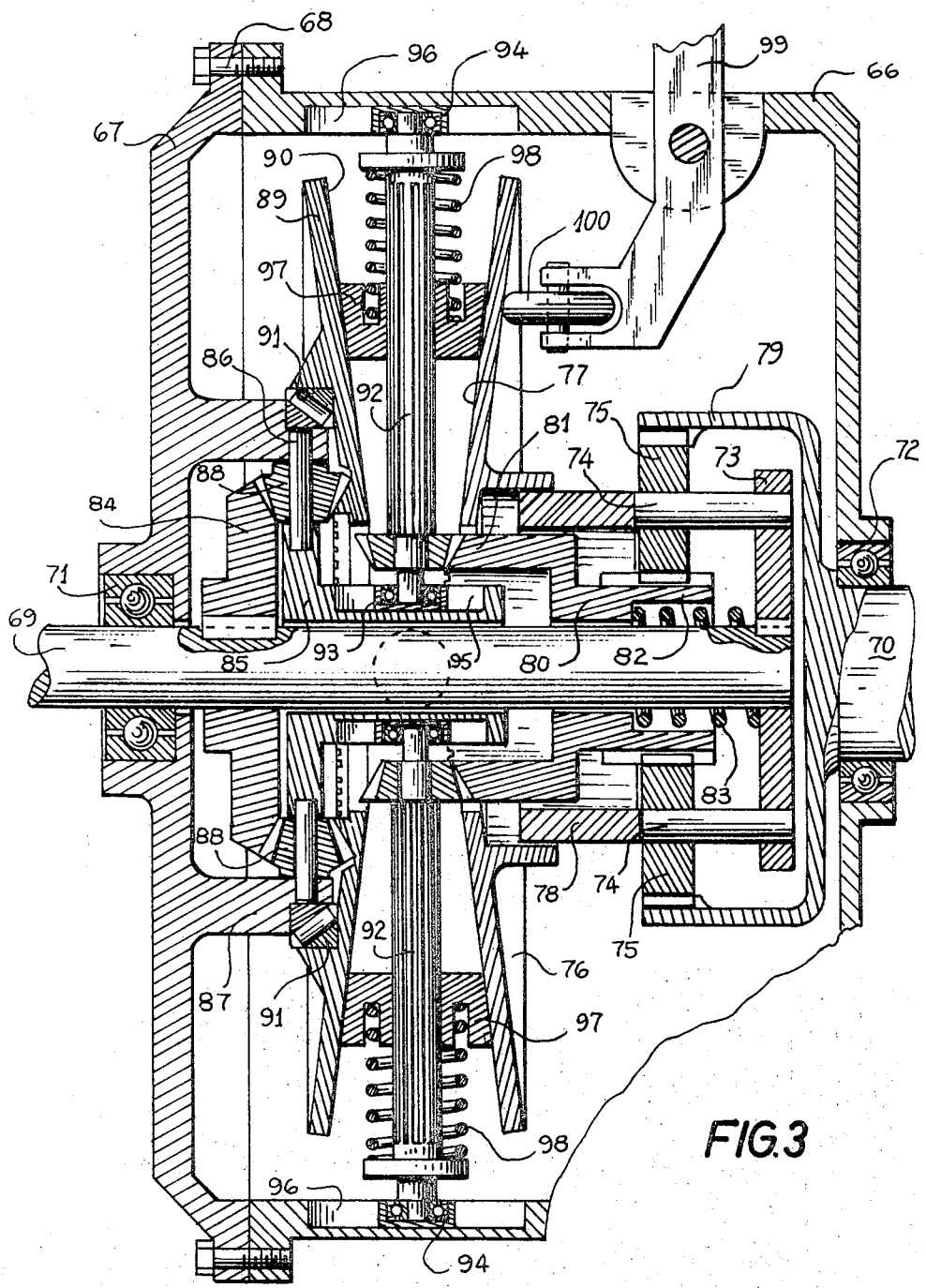
FIG. 3 is a cross-sectional view of a variable speed transmission according to a third embodiment of the invention.

The transmission, shown in FIG. 3, according to a third embodiment of the invention includes a casing 66 having an end cover 67 removably secured thereto as by screws 68 or the like. An input shaft section 69 and an output shaft section 70 rotatably extend coaxially through the casing 66 and the end cover 67 and are supported by bearings 71 and 72 respectively.

A planet carrier 73 is secured to the inner end of the input shaft section 69 for rotation therewith. Stub axles 74 extend from one face of the planet carrier 73 and carry each a planet 75. An axially displaceable friction member 76 having a conical face 77 is arranged to be rotated by a ring member 78 secured to the stub axles 74 for rotation therewith and with the input shaft section 69. The axially displaceable friction member 76 is also axially displaceable relative to the ring member 78. A ring gear 79 meshes with the planets 75 and is rigidly secured to the output shaft section 70 for rotation therewith. An intermediate gear member 80 is rotatably mounted onto the input shaft section 69 and is arranged for axially displacement relative thereto. The member 80 has a driven intermediate gear 81 at one end and a sun gear 82 at the opposite end in meshing engagement with the planets 75. A compression spring 83 axially urges the intermediate gear member 80 away from the planet carrier.

An input gear 84 is rigidly secured to the input shaft section 69 for rotation therewith. A hub member 85 is fixedly held around the input shaft section 69 by stub axles 86 radially secured to the hub member 85 and retained into an inner annular projection 87 of the cover 67. A reversing gear 88 is rotatably carried by each stub axle 86 in meshing engagement with the input gear 84 and with a ring gear formed on one side of a rotary friction member 89. The latter has a conical surface 90 on the other side and is rotatably carried and axially restrained by thrust bearings 91.

Intermediate shafts 92 extend radially and are rotatably supported at their opposite ends by bearings 93 and 94, which are axially slidable into axial slots 95 and 96 respectively. A friction roller 97 is engaged around each intermediate shaft 92 and is splined for longitudinal displacement relative thereto. A compression spring 98 biases each friction roller 97 radially inwardly relative to the axis of the input and output shaft sections 69 and 70.

A manual control lever 99 is pivoted onto the casing 66 and is provided with a roller 100 engaging the outside of the axially displaceable disc 76 to axially displace the latter against the biased action of the friction rollers 97. It must be noted that, as for the second embodiment of FIG. 2, when the friction rollers are displaced along the intermediate shafts, the latter are displaced laterally.

The rotation of the input shaft section 69 produces similar rotation of the axially displaceable friction member 76 and reverse rotation of the axially restrained other conically faced friction member 89. The speed ratios are changed by actuation of the manual control lever 99 or would be changed by a centrifugal system generally as in FIG. 1.

The generatrices of all the conically faced rotary friction members are preferably arranged to intersect on the common axis of the input and output shafts when optimum efficiency is desired from the transmission. This should be designed for the ratio of the transmission.

I claim:

1. A variable speed transmission comprising input shaft means and output shaft means coaxially positioned relative one to the other, a generally conically faced rotary friction member carried by said input shaft means for rotation therewith and positioned for axial displacement relative thereto, intermediate shaft means extending radially outwardly relative to said input and output shaft means, one friction roller secured onto said intermediate shaft means for rotation therewith and positioned for slidable displacement lengthwise thereof and for tangential engagement with the conical face of said rotary friction member, and gear means operatively connecting said intermediate shaft means to said output shaft means and positioned to transmit rotation to the latter.

2. A variable speed transmission as defined in claim 1, further including control means operatively engageable with said conically faced rotary friction member and positioned to axially displace the latter and to produce slidable displacement of said roller along said intermediate shaft means.

3. A variable speed transmission as defined in claim 2, wherein said control means includes a centrifugally responsive control operatively responsive to variation in the speed of rotation of said input shaft means and positioned to provide radial displacement of said friction roller relative to said input and output shaft means.

4. A variable speed transmission as defined in claim 3, wherein said centrifugally responsive control includes a bowl-shaped member coaxially secured on said input shaft means for rotation therewith, arms pivoted onto said axially slidable friction member and having a free end adjacent said bowl-shaped member, a rotary centrifugal weight rotatably mounted onto each of said free ends and positioned to roll against the concave face of said bowl-shaped member and thereby produce axial displacement of said conically faced rotary friction member towards and away from said friction roller in response to changes in the speed of rotation of said input shaft means.

5. A variable speed transmission as defined in claim 4, wherein said bowl-shaped member is positioned on the opposite side of said conically faced rotary friction member relative to said intermediate shaft means and said friction roller, with the concave face facing towards said conically faced rotary and axially slidable friction member, and a spring engages and urges the latter towards said bowl-shaped member and said rotary centrifugal weights into engagement with said concave face.

6. A variable speed transmission as defined in claim 2, further including another conically faced friction member axially fixed relative to said input shaft means on opposite side of said intermediate shaft means and friction roller relative to said rotary friction member, and said intermediate shaft means is mounted for axial displacement relative to said input and output shaft means.

7. A variable speed transmission as defined in claim 6, wherein said control means includes a manual control positioned to produce axial displacement of said conically faced rotary friction member and a resulting slidable displacement of said friction roller along said intermediate shaft means.

8. A variable speed transmission as defined in claim 7, wherein said another conically faced friction member is fixedly secured, said intermediate shaft means is mounted for rotation about the axis of said input and output shaft means and in radially extending position relative to the latter.

9. A variable speed transmission as defined in claim 8, wherein said gear means includes a driven output gear operatively connected to said output shaft means to rotate the latter and a pinion secured to the inner end of said intermediate shaft means, in meshing engagement with said driven output gear and positioned for planetary rotation around the latter, said driven output gear is axially slidable relative to said output shaft means and is drivingly connected thereto, and a first spring axially biases said driven output gear and said pinion for axial displacement thereof along the axis of said input and output shaft means.

10. A variable speed transmission as defined in claim 9, wherein said manual control includes a first and a second control rings and a manual lever, said first control ring is secured to said conically faced rotary and axially slidable friction member and positioned for axial displacement therewith and for rotation relative thereto around said input shaft means, said second control ring is rotatably mounted and axially restrained around and relative to said first control ring, said manual lever is positioned to engage said second control ring to rotate the latter relative to said first control ring, and said control rings include helical guide means positioned to allow relative rotation between said control rings and to produce axial displacement of said first ring in response to rotation of said second control ring and/or axial displacement of said axially slidable friction member.

11. A variable speed transmission as defined in claim 10, wherein said helical guide means includes helical slots in said second control ring and studs secured to said first control ring and projecting therefrom into said helical slots.

12. A variable speed transmission as defined in claim 8, wherein the conically faced friction members, the gear members and the manual control members are of predetermined proportions to selectively produce forward, reverse and neutral drives.

13. A variable speed transmission as defined in claim 8, wherein said conically faced rotary friction member, said friction roller and said gears are positioned to produce a speed ratio of said friction roller relative to said rotary friction member which equals the speed ratio of said gears, thereby allowing a dynamic neutral.

14. A variable speed transmission as defined in claim 1, further including another conically faced friction member axially fixed relative to said input shaft means on opposite side of said intermediate shaft means and friction roller relative to said rotary friction member, and said intermediate shaft means is mounted for axial displacement relative to said input and output shaft means.

15. A variable speed tranamission as defined in claim 14, further including a plurality of intermediate shaft means projecting radially relative to the axis of said input and output shaft means, a friction roller secured onto each of said intermediate shaft means, responsive to the centrifugal action thereon, and positioned for longitudinal displacement along the latter in response to the centrifugal action thereon, and a pinion secured to the inner end of each of said intermediate shaft means in meshing engagement with said driven output gear.

16. A variable speed transmission as defined in claim 15, further including a carrier holding said plurality of intermediate shaft means for rotation about their axis and for bodily rotation around the axis of said input and output shaft means.

17. A variable speed transmission as defined in claim 16, wherein said carrier includes a ring circumscribing said plurality of intermediate shaft means and pivots secured to said ring and extending radially inwardly therefrom, each of said intermediate shaft means includes a tubular shaft rotatably carried by a corresponding one of said pivots, each of said friction rollers is secured to a tubular shaft section engaging around a corresponding one of said tubular shafts, and bidirectional cam coupling elements secured to said tubular shafts and tubular shaft sections and positioned to yieldably couple each tubular shaft section to the corresponding tubular shaft and to produce an increased radially inward bias on said friction rollers in response to an increased load on the output shaft means.

18. A variable speed transmission as defined in claim 14, wherein the generatrices of all said conically faced rotary friction members intersect the common axis of said input and output shaft means when said rotary friction members are in predetermined positions axially along said input and output shaft means.

19. A variable speed transmission as defined in claim 18, wherein said generatrices intersect said common axis when said rotary friction members are positioned to produce substantially the mostly used speed ratio of the transmission.

20. A variable speed transmission as defined in claim 1, further including a reversing gear input drive drivingly connecting said input shaft means to said another conically faced friction member and positioned to drive the latter in reverse relative to said input shaft means and said conically faced rotary and axially displaceable friction member, bearing means rotatably carrying said another conically faced friction member and axially restraining the same relative to said input shaft means, and a planetary gear train operatively connected intermediate said input and output shaft means and positioned coaxial therewith.

21. A variable speed transmission as defined in claim 20, wherein said planetary gear train includes a planet carrier, a sun gear, a ring gear, and planets rotatably carried by said planet carrier in meshing engagement with the sun gear and the ring gear, said planet carrier is secured to said input shaft means for rotation therewith and is drivingly connected to said axially displaceable friction member for rotation therewith and is positioned for axial displacement of the latter relative thereto, said ring gear is secured to said output shaft means for rotation therewith, said sun gear is connected to said gear means to be driven by said intermediate shaft means, the latter and said gear means are axially displaceable relative to said input shaft means and are biased towards said another conically faced friction member.

22. A variable speed transmission as defined in claim 21, further including a manual control means comprising a manual lever and a rotary member mounted onto one end of said manual lever and positioned to engage said axially displaceable friction member to bias the latter against said friction roller, and to radially displace the latter.

23. A variable speed transmission as defined in claim 1, further including spring means positioned to radially bias said friction roller into said tangential engagement.

24. A variable speed transmission as defined in claim 23, wherein said spring means includes a compression spring coiled around said intermediate shaft means in engagement with said friction roller and positioned to bias the latter radially inwardly relative to the axis of said input and output shaft means.

25. A variable speed transmission as defined in claim 1, wherein said gear means includes a pinion secured to the inner end of said intermediate shaft means for rotation therewith and a driven gear operatively connected to said output shaft means in meshing engagement with said pinion and positioned to transmit the rotation of the latter to said output shaft means.

26. A variable speed transmission as defined in claim 1, further including a plurality of intermediate shaft means projecting radially relative to said input and output shaft means, a friction roller secured onto each of said intermediate shaft means, and a pinion secured to the inner end of each of said intermediate shaft means in meshing engagement with a driven output gear forming part of said gear means.

* * * * *